Aug. 5, 1969 T. J. GRESSITT ET AL 3,459,878

CABLE IDENTIFICATION AND SPACING SYSTEM

Filed May 23, 1967 2 Sheets-Sheet 1

INVENTORS T. J. GRESSITT
R. B. RAMSEY

BY Charles E. Graves

ATTORNEY

Aug. 5, 1969 T. J. GRESSITT ET AL 3,459,878

CABLE IDENTIFICATION AND SPACING SYSTEM

Filed May 23, 1967 2 Sheets-Sheet 2

3,459,878
Patented Aug. 5, 1969

3,459,878

CABLE IDENTIFICATION AND SPACING SYSTEM

Tillman J. Gressitt, Lutherville, and Raymond B. Ramsey, Towson, Md., assignors to Bell Telephone Laboratories, Incorporated, Murray Hill, N.J., a corporation of New York Filed May 23, 1967, Ser. No. 640,568
Int. Cl. H01b 7/36, 11/02
U.S. Cl. 174—112 20 Claims

ABSTRACT OF THE DISCLOSURE

Groups of individual conductors in an electrical cable structure are maintained in a desired spaced sequence by periodically placed flexible strips that surround each conductor of a given group. Such strips may be polyethylene applied in two lays: an overlay and an underlay, for example. The combination of known conductor sequence within the groups and color coding of the strips makes possible a coding scheme without resort to color-coded insulation.

This invention relates to multiconductor electrical cables and more specifically to a novel structure for identifying each wire and also for effecting and maintaining a prescribed wire-to-wire spacing to the end that connections and rearrangements of the wires are greatly simplified.

While broadly applicable to any multiconductor electrical cable or cord, the invention hereinafter is described as applied to wiring for key telephone systems.

Background of the invention

A key telephone system in general is a communications system in which several telephones are connected in some fashion with one another and also to one or more telephone line circuits leading to a central office. Usually more than one of the incoming telephone lines, and in some cases all lines, are connected to each of the telephone sets making up the system. The sets often also are provided with other purely local features including, just for example, incoming call hold, local buzzer and message waiting lamp.

As is well known to all persons involved in the layout and installation of key telephone systems, a very large number of wire interconenctions is needed between and among the individual sets in the system in order that the system function as designed. For example, if its is desired to connect a given telephone line circuit to each of ten stations of a key telephone system, it is necessary that this telephone line make an appearance in the form of a wire pair at each of the ten stations. The more line circuits that are needed at each station, obviously the more such wire pairs are necessary to effect these interconnections. Additionally, the needs which the system originally was built to serve change more frequently than not; and hence periodic substantial rearrangements of connections are the rule for most key systems.

This invention is directed to a scheme for greatly facilitating the original connections and subsequent rearrangements of the large numbers of wire pairs serving key telephone systems, the advantages of which will be at once apparent when compared with present-day installation practices.

Today, in the usual building serviced by one or more key telephone systems, a riser cable containing the line circuit conductors makes an appearance in a service closet or the like on a given floor. The several line circuits to be associated with a given key system on that floor are led from the riser cable and connected to a key telephone switching set through a first cross-connecting field. From the output of the key equipment, connections are made for each line to a second cross-connecting field. Typically at the input side of this second field, three wire pairs make an appearance for each number present in the key system.

The aforementioned riser cable conductors are each color-coded and stranded in pairs into groups bound by a helical color-coded tape. These strands are then bunched to form the cable. Anti-crosstalk twist is applied both to the pairs and the strands. The connections between the cross-connect fields and the key telephone switching set are effected by raw-ended, inside wiring cable.

Connections between the output side of the second cross-connect field and the individual telephone sets in the system are effected in various ways today. For one, a further length of inside wiring cable is spliced from the mentioned output side to a terminal block near the set, and then the set cord is connected through a pair of plug connectors to this terminal block. Or, the link is made with connector cable available in prescribed lengths and equipped at both ends with plug connectors. In both cases, conductor pairs are insulation color-coded and, for practical purposes, randomly associated in the cable.

To illustrate the problems confronted by an installer in connecting up a typical key telephone system, consider the installation of the inside wiring cable just mentioned. In order to wire-in such a cable the installer must first locate and identify each of the fifty conductors individually by its color code. At first he is looking for one wire in a group of fifty; once this is located, his problem is to locate one wire in a group of forty-nine, and so on. His rate of progress obviously depends on good color vision and ability to distinguish readily standard color codes which, it develops, are far from optimal choices. Additionally, he must place each such wire individually into the correct terminal connector at the cross-connect point in the service closet. Connection of each individual wire to these terminals at best requires a special tool which inserts each individual conductor into a clip and then pares off any excess conductor. Other more time-consuming types of connection apparatus including stud connections, however, are still in service.

The time spent by an installer merely in locating and identifying individual wires and wire pairs is, under present practices, a very significant part of the installation cost. Moreover, the time spent in connecting the wires to cross-connect terminals represents further substantial time. Of course, the problems incident to installation are also present during any rearrangements. An appreciation of the labor costs chargeable to performing the above operations is gained by observing that the annual number of telephone sets newly associated with key telephone equipment involves well over 10 million complete cable connections per year in this country alone.

Additionally, however, as part of the present art schemes, the use of plug-ended connector cable often results in added substantial charge on the total installation costs for key systems. As noted, these cables are purchased in prescribed lengths with the plugs already affixed to the cable. Rarely is the purchased length exactly right for the application. And, since it is not possible to estimate precisely in advance the cable lengths needed, installation supervisors tend to err on the high side rather than risk being caught short. Accordingly, any excess cable length is placed in an unsightly loop, or simply cut off. In either event the excess cable is completely wasted. Further, the needs of a given installation often are such that the plugs, which are quite expensive, also are cut off and not used.

Accordingly, the following are objects of the present invention:

- to simplify the physical interconnections involved in key telephone systems;
- to reduce the time and cost of key telephone system installations;
- to simplify the rearrangement of interconnections in key telephone systems;
- to simplify the labor procedures involved in installing and rearranging key telephone connections; and
- to reduce cable wastage now occurring in the installation procedure.

Summary of the invention

These and other objects are achieved by the present invention involving in broad principle a cable structure in which individual wire groups are maintained in a known and spaced sequence by periodically placed flexible strips that surround each wire member of a group.

In one embodiment, the flexible strips are polyethylene tape, applied by suitable machinery to each group during the cable manufacturing process at a time when the wire sequence is in a known configuration. The tape or indexing strip may comprise one lay on top and an opposite lay on the underside of a given wire group. Advantageously, the strips are slidable longitudinally along the wires and are placed, just for example, at eight to twenty-four inch intervals or so along the entire length of the cable during manufacture. This makes it possible to enter the cable at any point and to find within, say, twelve inches a positive identification for each conductor.

Additionally, however, the tapes are applied so as to produce a desired spacing between each conductor as well as to maintain the desired conductor sequence. Thus in accordance with this facet of the invention, the wires are suitably spaced for direct one-shot entry of the entire group in the proper sequence into a terminal block having like spacing between its terminals.

Another aspect of the invention is that the strips are color-coded so as to uniquely identify each group. The right-left sequence of a given wire group is given, for example, by a tab on one end of the strip. And, since as noted the wires are maintained in a prescribed sequence by the strip, it is seen that a complete coding scheme is afforded without resort to color-coded insulation.

Hence, in contrast to earlier inside wiring or connector cable which use typically fifty separate insulation color codes in a mixture of fifty disassociated wires, the present invention makes possible the return to a single color insulation and five or fewer strip colors. Further, from the single color insulation there flows the added benefit that at the manufacturing end fewer and less complicated extruders are required, and also inventories of one color instead of fifty are possible.

The installation of wire prepared in accordance with the present invention is accomplished simply by the installer laying out a length of such cable between the telephone set location and the closet termination panel. He cuts it to the exact length required and skins back the outer jacket until he exposes several of the indexing strips. The appropriate color-coded strip is selected and slidably adjusted, and the right-left sense of the group is noted from the tab. The wires now are spaced and sequenced by the strip for immediate one-shot connection to a mating set of terminal connectors. Suitable terminals are those described, for example, in the copending application of B. C. Ellis, Jr.-R. B. Ramsey- R. A. Swanson, Ser. No. 634,567, filed Apr. 28, 1967, and assigned to applicants' assignee. Each of the remaining conductor groups are similarly connected.

The broad advantage of multiconductor cable constructed in accordance with the teachings of the present invention is that quick connections with raw ended cables are possible because the wire is both indexed and sequentially spaced by the indexing tape. Further, the use of raw ended cable makes test points available which is not the case with plug-ended cable purchased in set lengths. Additionally, it is also possible to provide a terminal block connector with suitably spaced terminals in the telephone set itself to effect connections more directly from remote cross-connect fields to the telephone.

One feature of the invention, accordingly, is the inclusion of a flexible indexing strip crosswise over a group of conductors of a multiconductor cable such that these conductors are both spaced from one another and maintained in an ordered sequence.

A second feature of the invention involves the color coding of the strips and the concomitant elimination of color coding applied to the conductors themselves.

A third feature of the invention resides in the slidability of the indexing strip longitudinally along the wire group around which it is enveloped.

These and other objects, features and advantages of the invention will be apprehended from a detailed description of one illustrative embodiment thereof and in the drawing which follows.

Detailed description of the invention

Figure 1:
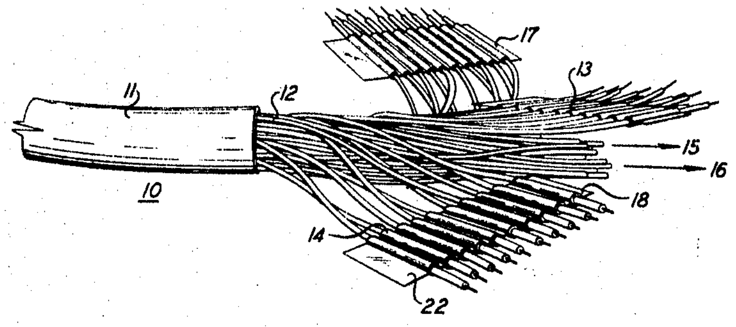
FIG. 1 is a perspective view of a wiring cable embodying the invention.

FIG. 1 depicts a multiconductor electrical cable of the type, for example, as mentioned above denoted inside wiring cable. This cable designated generally as 10 consists of an outer jacket 11 which is usually of a PVC composition, and a multiplicity of conductor pairs 12 which are variously twisted to reduce crosstalk.

Figure 2:
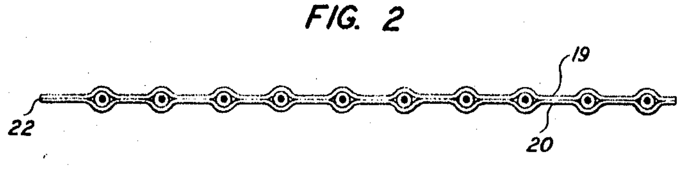
FIG. 2 is a sectional front view of an indexing strip applied to a wire group.
Figure 5:
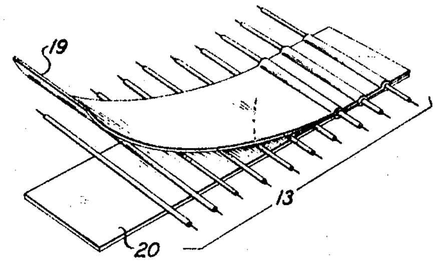
FIG. 5 is a perspective view showing the application of one form of indexing strip to a group of wires.

In accordance with a major aspect of the present invention, the multiplicity of conductor pairs 12 is subdivided into manageable groups, and onto each of these groups is placed the inventive index strips. First, if the cable 10 comprises a twenty-five pair content for a total of fifty wires, it may be convenient to subdivide the entirety into five groups of ten wires each: for example, the groups denoted 13, 14, 15, 16 and 17. As will be seen later, the number of wires selected to populate each group advantageously is determined by the number of terminals existing in a module of a terminal connector to which the wire groups are to be connected. An indexing strip 18 is applied to each of the wire groups 13 through 17. One form of the indexing strip 18 is depicted in FIGS. 2 and 5. Here, the strips are made up of a sandwich of an upper layer 19 and a lower layer 20. Each layer 19, 20 advantageously is a thin, flexible substantially elastomeric strip of the order of one-half inch in width and .0025 inch in thickness; and composed of polyethylene, for example. Its length depends upon the spacing deisred between the conductors and upon the number of conductors enveloped. Obviously, the width as well as the thickness of the strip may be varied depending upon strength and flexibility requirements. As applied to telephone inside wiring cable, an acceptable width range is from about ⅛" to 1" for example; an acceptable thickness range is from .001 to .010 inch.

Placement of the strips 18 upon a given group of conductors in the manner shown in FIG. 5, for example, may be achieved in several ways. To illustrate, each wire of the wire group 13 is, during some time in its assembly, intentionally spaced a desired amount from its neighbor as shown in FIG. 2 where, for purposes of illustration, the distance is equal between adjacent wires. The layers 19 and 20 are applied above and below the conductor group 13 and suitably sealed together. As observable from FIG. 3, however disarranged the wires in the groups 13–17 may be between the periodically placed indexing strips, their spacing at either side of the outstretched strip edge is fixed.

Pursuant to another aspect of the invention, the indexing strips are applied so that each may be slided along the group of wires which it envelopes. One way of achieving this feature is to select a composition for the indexing strip that exhibits a low coefficient of sliding friction with respect to the composition of the insulation surrounding each of the wires in the group. To permit the sliding of the indexing strips with respect to the wire group without disturbing the critical spacing of the wires, it is necessary that the contacting parts of the two layers 19, 20, as seen in FIG. 2, occurring intermediate of adjacent wires be firmly bonded together. Heat bonding of the layers 19, 20 is a generally satisfactory method of insuring a firm adhesion between the two layers. Solvent adhesion with appropriate materials is another alternative.

Figure 3:
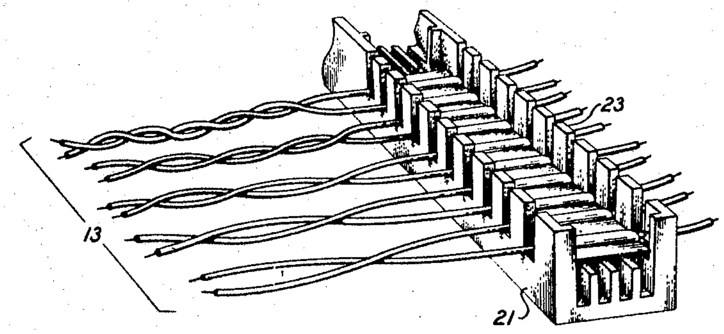
FIG. 3 is a perspective view showing indexed wires applied to a mating block.
Figure 4:
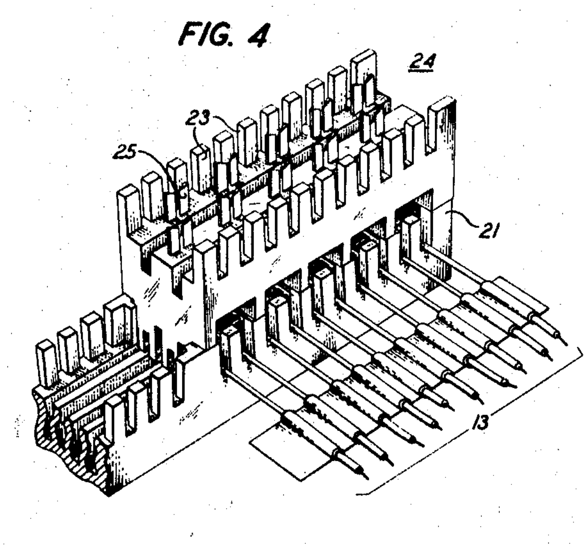
FIG. 4 is a perspective view of an index wiring group applied to a connector block.

The advantages of the alignment achieved by indexing strip 18 are apparent from an inspection of FIGS. 3 and 4 which show a part of a connector block 21, similar to one disclosed in the cited copending application of Ellis et al. As earlier noted, it is advantageous to separately color-code all indexing strips 18 belonging to a given wire group; and thus eliminate the need for any color coding of the wire insulation. The wires of group 13, for example, are installed on block 21 by drawing the indexing strip 18 to the point where the indexing strip 18 surrounding the wires 13 will enter block 21, taking into account the tab 22 denoting the right-left sense of the wires. Then, with strip 18 disposed intermediate of the combs 23, the wire group is laid in place in one motion. As the spacing of the wires in the group 13, maintained by indexing strip 18, is the same as the center-to-center spacing between the combs 23 all wires automatically align with and enter spaces without need to attend to the alignment of each separate wire.

As seen in FIG. 4, a connector 24 with terminal members 25 and combs 23 similar to those of block 21 is adapted to connect with the terminal block 21 onto the wire group 13 laid thereupon. The terminal members 25 engage the respective wires in group 13, piercing through the insulation. Then, further connections to terminal 24 may be effected by the same inventive practices involving indexing tape 18 as earlier described.

In a fashion substantially identical to those already described, any wire group 13–17 may be connected directly to a terminal strip such as 21 housed inside a telephone station. Not only is the presently-used expensive plug connector eliminated thereby, but the unsightly wire loop often left over after an installation is completely avoided.

The indexing strips are applied periodically to each of the wire groups 13–17 as, for example, one strip each 10–24 inches. Machinery suitable for insuring that the right-left sense of the wires in a given group is maintained for each application of an indexing strip is found in the copending patent application of B. C. Ellis, Jr.-R. B. Ramsey-R. A. Swanson, Serial No. 634,567.

It should be apparent that indexing strip 18 need not be made up of separate layers 19, 20, and instead may be comprised of a single layer by methods currently available to the art. Further, the width of the indexing strips 18 can of course be any convenient size readily handleable by an installer. The material selected for the indexing strip need not be polyethylene but in fact can be any film plastic sealable by heat, solvent adhesion or other method. Although a stringlike indexing means is readily envisionable, the tape configuration is preferred because its strength is enhanced where necessary by increasing its width instead of having to add to a diameter as would be the case for stringlike cross sections.

Additionally, strip 18 also may be an expansible, accordianlike web or a highly elastic material. In the latter case, the indexing—that is, the spacing between adjacent wires—would be variable over a limited range and yet by virtue thereof the wire group could be installed on many different sizes of terminal blocks. If, for example, the strip 18 of FIG. 5 is a highly elastic material, then by stretching it the wires of the group 13 could be indexed to, say, alternate ones of the slots between the combs 23 of block 21 in FIG. 3.

Figure 6:
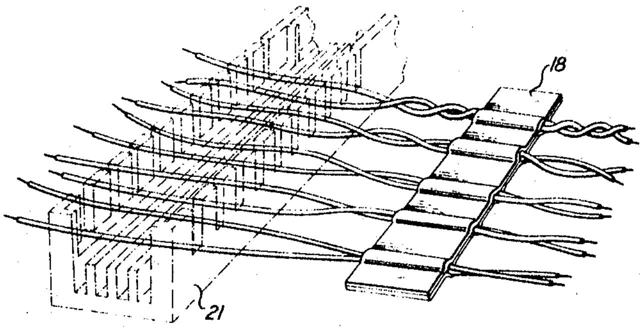
FIG. 6 is a perspective view showing the indexing strip applied to wire pairs.

A further application of the invention concept is depicted in FIG. 6 which shows the index strip 18 applied to wire pairs instead of to individual wires. Here, the wire pairs are sequenced and a 2-color insulation coding completes the coding scheme. While highly beneficial as a coding plan, the further advntage of wire spacing is not as significant in this emobdiment of the invention. In all cases, however, the wire pair twist is not impaired by the indexing strip. Whether the conductors are singles laid parallel, twisted pair of individual conductors of twisted pair, the inventive concept exhibits broad and useful applicability.

It is to be understood that the embodiments described herein are merely illustrative of the principles of the invention. Various modifications may be made thereto by persons skilled in the art without departing from the spirit and scope of the invention.

What is claimed is:

1. In the manufacture of multiconductor cable, a method for coding each conductor therein, comprising the steps of arranging the conductors at specified points along the cable in a fixed, side-by-side sequence defining the identifying code; and affixing a separate flexible element to the conductors crosswise at each said point, thereby to effect periodic recurrence of the fixed sequence and thus also of the identifying code.

2. The method of claim 1 wherein said element comprises an elastomeric tape.

3. In the manufacture of multiconductor cable in which conductors are variously twisted in pairs and the pairs are randomly associated, a method for identifying each conductor comprising the steps of subdividing the conductors into discrete groups;

periodically arranging the conductors of each group in a recurring side-by-side sequence, the latter defining the identifying; and affixing a flexible element to the conductors crosswise thereof where the conductors are sequentially arranged, thereby to retain at such points the conductor sequence.

4. The method of claim 3 wherein said flexible element comprises an elastomeric tape.

5. In the manufacture of multiconductor cable in which conductors are variously twisted in pairs and the pairs are randomly associated, a method for identifying and spacing conductors therein comprising the steps of arranging a multiplicity of said conductors in a definite spaced, side-by-side sequential array at specified points along the cable; and affixing a flexible element to the conductors crosswise at each said point, thereby to effect periodic recurrence of the spacing and of the sequence.

6. The method of claim 5 wherein said conductor spacing is determined by the terminal spacing of a comb-type connector block to which said conductor multiplicity is applied.

7. The method of claim 6 wherein said flexible element comprises an elastomeric tape.

8. In the manufacture of multiconductor cable in which conductors are variously twisted in pairs and the pairs are randomly associated, a method for effecting pair identification comprising the step of subdividing the conductor pairs discrete groups;

periodically arranging the conductor pairs of each group in a recurring side-by-side sequence, the latter defining an identifying code; and affixing at such points a flexible element to the conductor pairs crosswise thereof, thereby to retain the desired conductor pair sequence.

9. A communications cable comprising a plurality of individually insulated conductors arranged in pairs having differing twist intervals, and a plurality of flexible elements attached at intervals to all said conductors crosswise, each element comprising means for maintaining said conductors in a prescribed sequence.

10. A communications cable as in claim 9, wherein each said element further comprises means for maintaining said conductors in a prescribed side-by-side spacing at the point of contact of said element with said conductors.

11. A communications cable as in claim 10, wherein each said element further comprises an elastomeric tape, and each said tape comprises means for identifying the right-left sense of the sequentially arranged conductors.

12. A communications cable comprising a plurality of individually insulated conductors arranged in groups, each group comprising a plurality of conductor pairs with each pair having a unique twist length, and all conductor insulation being of the same color;

a plurality of flexible elements affixed at intervals around all conductors in each of said groups, the elements associated with a given group having a distinguishing characteristic, and each element comprising means for maintaining the conductors in its group in a prescribed sequence; and means for maintaining the conductors in a prescribed side-by-side spacing.

13. A communications cable as in claim 12 wherein each said element comprises an elastomeric tape, and each said tape comprises means for identifying the right-left sense of the sequentially arranged conductors.

14. A communications cable in accordance with claim 13 wherein said identifying means comprises an end tab extension of said tape, all such tab extensions in a given sequentially spaced conductor group being disposed adjacent the same outboard-most conductor.

15. A communications cable in accordance with claim 14, wherein each said tape comprises an undistended length in which said conductors are spaced in accordance with said prescribed side-by-side spacing; and each said tape further comprises a plurality of distened positions in which the side-by-side conductor spacing is increasingly wider.

16. A communications cable in accordance with claim 14, wherein the distinguishing characteristic comprises a unique color imparted to said tape.

17. An identification and spacing system for a group of wires comprising a plurality of spacing devices comprising flexible strips disposed across said wire group at regular intervals, each strip comprising means separately enveloping each individual wire to form a desired equally spaced sequence thereof, which sequence and spacing is maintained by each successive strip.

18. An identification and spacing system for a multiple insulated conductor cable comprising a plurality of spacing devices comprising flexible strips disposed at regular intervals across each of several conductor groups within said cable, the strips associated with a given group having a distinguishing color code, each strip comprising means separately enveloping each individual conductor in its group to form a desired equally-spaced sequence thereof, which sequence and spacing is maintained by each successive strip in the given group.

19. An identification and spacing device as in claim 18 wherein each strip comprises first and second layers of a polyethylene plastic or the like applied on opposite sides of said conductors and heat sealed to each other in the inter-conductor space.

20. An identification and spacing device as in claim 19 further comprising means for effecting a slidable connection of said first and second polyethylene plastic layers with respect to the insulated conductors they envelop.

References Cited

UNITED STATES PATENTS

| | | | |
|---|---|---|---|
| 1,727,972 | 9/1929 | Ford | 174—112 |
| 2,182,968 | 12/1939 | Lunsford | 174—146 X |
| 3,082,292 | 3/1963 | Gore. | |
| 3,097,036 | 7/1963 | Cornell | 174—117 X |
| 3,158,181 | 11/1964 | Gore. | |
| 3,364,402 | 1/1968 | Davis | 174—117 X |

E. A. GOLDBERG, Primary Examiner

U.S. Cl. X.R.

29—624; 40—316; 174—117, 146